(12) United States Patent
Zhang

(10) Patent No.: US 10,499,109 B2
(45) Date of Patent: Dec. 3, 2019

(54) METHOD AND APPARATUS FOR PROVIDING COMBINED BARRAGE INFORMATION

(71) Applicant: Baidu Online Network Technology (Beijing) Co., Ltd., Beijing (CN)

(72) Inventor: Ronghui Zhang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 83 days.

(21) Appl. No.: 15/425,210

(22) Filed: Feb. 6, 2017

(65) Prior Publication Data
US 2018/0035168 A1 Feb. 1, 2018

(30) Foreign Application Priority Data
Jul. 28, 2016 (CN) .......................... 2016 1 0615661

(51) Int. Cl.
| | |
|---|---|
| *H04N 5/445* | (2011.01) |
| *H04N 21/475* | (2011.01) |
| *H04N 21/431* | (2011.01) |
| *H04N 21/462* | (2011.01) |
| *H04N 21/4788* | (2011.01) |
| *H04N 21/488* | (2011.01) |
| *H04N 21/472* | (2011.01) |

(52) U.S. Cl.
CPC ......... *H04N 21/475* (2013.01); *H04N 21/431* (2013.01); *H04N 21/4316* (2013.01); *H04N 21/4622* (2013.01); *H04N 21/4788* (2013.01); *H04N 21/4882* (2013.01); *H04N 21/472* (2013.01)

(58) Field of Classification Search
CPC .. H04N 7/0882; H04N 7/0884; H04N 7/0888; H04N 5/445; H04N 5/44513
See application file for complete search history.

(56) References Cited

U.S. PATENT DOCUMENTS

| | | | |
|---|---|---|---|
| 2005/0132420 A1* | 6/2005 | Howard ................. | G06F 3/017 725/135 |
| 2005/0262542 A1* | 11/2005 | Deweese ............. | H04L 12/1818 725/106 |
| 2010/0030578 A1* | 2/2010 | Siddique ............ | G06Q 10/0637 705/3 |
| 2012/0303439 A1* | 11/2012 | Flitcroft ............... | G06Q 10/107 705/14.36 |
| 2013/0311485 A1* | 11/2013 | Khan .................. | G06F 17/2785 707/748 |

* cited by examiner

*Primary Examiner* — Jivka A Rabovianski
(74) *Attorney, Agent, or Firm* — McCarter & English, LLP

(57) ABSTRACT

An object of the present disclosure is to provide a method and apparatus for providing combined barrage information. Specifically, the method comprises determining first barrage information and second barrage information to be combined in a current video image; in response to a combining operation executed by the user to combine the first barrage information and the second barrage information, combining the first barrage information with the second barrage information to form combined barrage information, and displaying a reply window corresponding to the combined barrage information; acquiring reply content input by the user in the reply window to form, with the combined barrage information, combined reply barrage information; providing the combined reply barrage information to the user.

12 Claims, 4 Drawing Sheets

METHOD AND APPARATUS FOR PROVIDING COMBINED BARRAGE INFORMATION

CROSS-REFERENCE TO RELATED APPLICATION

This application claims the priority of Chinese Patent Application No. 201610615661.4, entitled "Method and Apparatus for Providing Combined Barrage Information," filed on Jul. 28, 2016, the content of which is incorporated herein by reference in its entirety.

TECHNICAL FIELD

The present disclosure relates to the technical field of video, and particularly to a technology for providing combined barrage information.

BACKGROUND

People usually like providing their comments when watching a network video. During a video broadcast, the phenomenon that many comments are displayed in the form of simultaneously appearing captions is called barrage. Accordingly, commentary information displayed dynamically is barrage information. When different users view the same video, there is usually a need to interact with respect to the comments posted by different users, for example, reply to comments posted by other users. However, the conventional art cannot implement replying to multiple pieces of barrage information simultaneously, and reduces a user's efficiency to converse with multiple people simultaneously.

SUMMARY

An object of the present disclosure is to provide a method and apparatus for providing combined barrage information.

According to an aspect of the present disclosure, there is provided a method for providing combined barrage information, the method comprising:

determining first barrage information and second barrage information to be combined in a current video image;

combining the first barrage information with the second barrage information to form combined barrage information in response to a combining operation executed by the user to combine the first barrage information and the second barrage information, and displaying a reply window corresponding to the combined barrage information;

acquiring reply content input by the user in the reply window to form, with the combined barrage information, combined reply barrage information; and providing the combined reply barrage information to the user.

According to another aspect of the present disclosure, there is further provided a provision apparatus for providing combined barrage information, the provision apparatus comprising:

means for determining first barrage information and second barrage information to be combined in a current video image;

means for combining the first barrage information and the second barrage information to form combined barrage information in response to a combining operation executed by the user to combine the first barrage information and the second barrage information, and displaying a reply window corresponding to the combined barrage information;

means for acquiring reply content input by the user in the reply window to form, with the combined barrage information, combined reply barrage information; and means for providing the combined reply barrage information to the user.

According to a further aspect of the present disclosure, there is further provided a barrage player, wherein the barrage player comprises the provision apparatus of providing combined barrage information according to a further aspect of the present disclosure.

As compared with the prior art, by combining multiple pieces of barrage information and forming the reply window so that the user may reply to multiple pieces of barrage information at the same time, an embodiment of the present disclosure improves the efficiency of the user conversing with multiple persons at the same time and boosts the user's video communication experience.

BRIEF DESCRIPTION OF THE DRAWINGS

Other features, objectives and advantages of the present disclosure will be made more apparent by reading through detailed description of unrestrictive embodiments with reference to the following figures.

and

Figure 6:
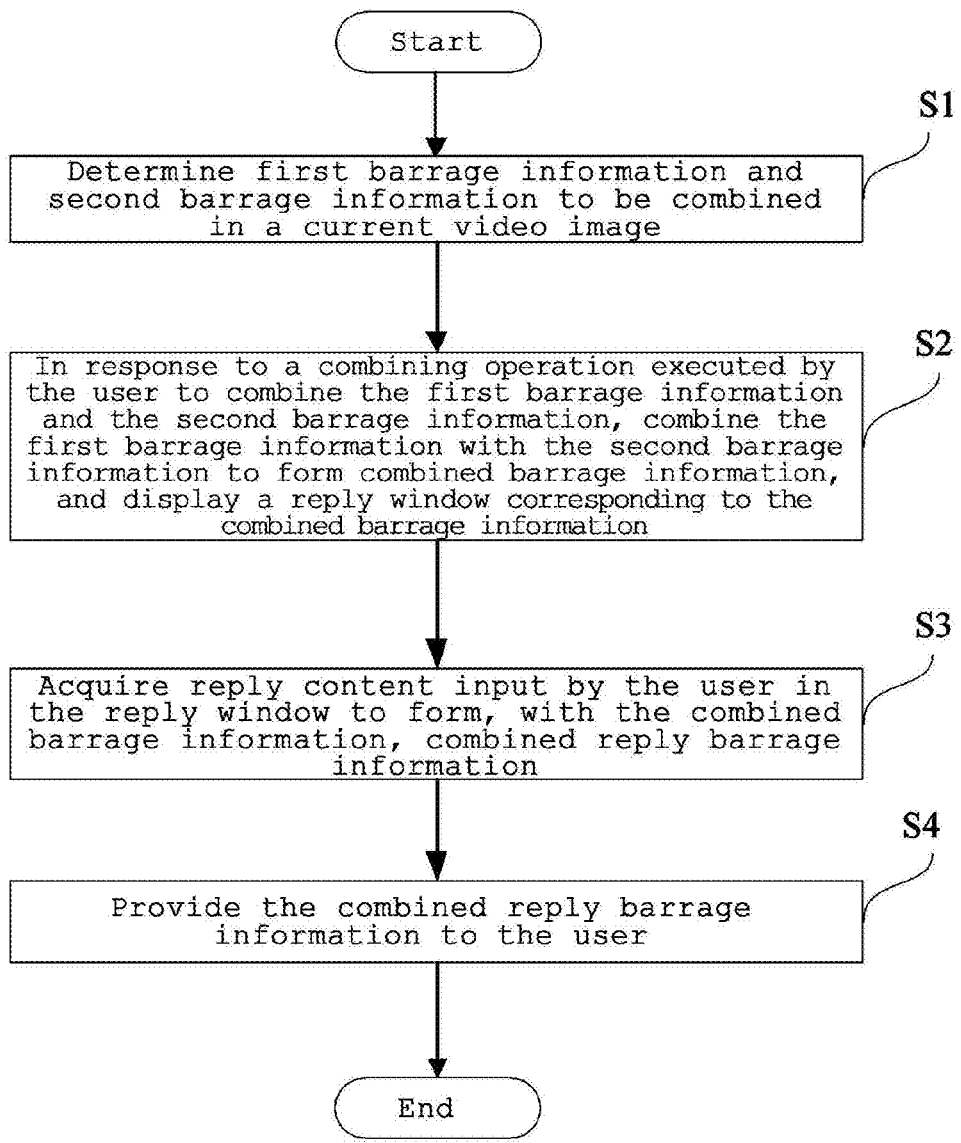

FIG. 6 illustrates a flow chart of a method for providing combined barrage information according to another aspect of the present disclosure.

Identical or like reference signs in figures denote identical or similar parts.

DETAILED DESCRIPTION OF EMBODIMENTS

The present disclosure will be described in more detail with reference to figures.

Figure 1:
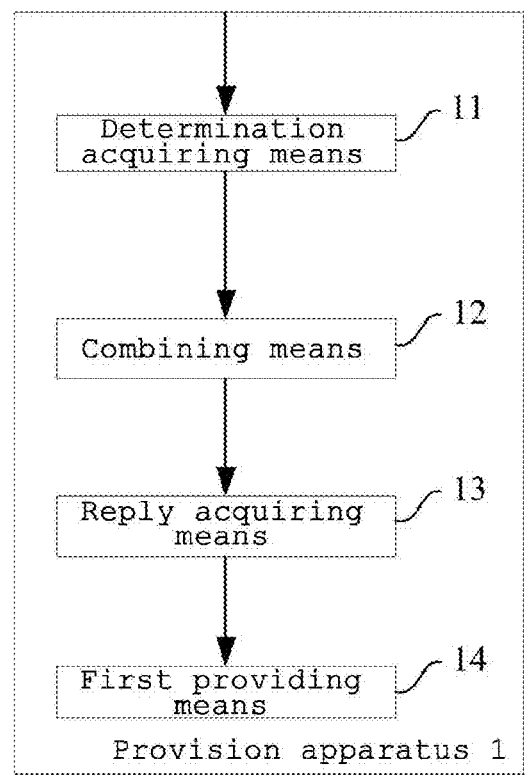
FIG. 1 illustrates a block diagram of a provision apparatus for providing combined barrage information according to one aspect of the present disclosure.

FIG. 1 illustrates a block diagram of a provision apparatus for providing combined barrage information according to one aspect of the present disclosure, wherein the provision apparatus 1 comprises means (hereinafter referred to as "determining means 11") for determining first barrage information and second barrage information to be combined in a current video image; means (hereinafter referred to as "combining means 12") for, in response to a combining operation executed by the user to combine the first barrage information and the second barrage information, combining the first barrage information and the second barrage information to form combined barrage information, and displaying a reply window corresponding to the combined barrage information; means for (hereinafter referred to as "reply acquiring means 13") for acquiring reply content input by the user in the reply window to form, with the combined barrage information, combined reply barrage information; means (hereinafter referred to "first providing means 14") for providing the combined reply barrage information to the user.

Specifically, the determining means 11 determines first barrage information and second barrage information to be combined in a current video image; the combining means 12, in response to a combining operation executed by the user to combine the first barrage information and the second barrage information, combines the first barrage information with the second barrage information to form combined barrage information, and displays a reply window corresponding to the combined barrage information; the reply acquiring means 13 acquires reply content input by the user in the reply window to form, with the combined barrage information, combined reply barrage information; the first providing means 14 provides the combined reply barrage information to the user.

Here, the provision apparatus 1 is used to combine the barrage information about the video image and provide it to the user, so that the user may replay to the combined barrage information. It includes, but is not limited to, a network device, mobile device or an apparatus formed by integrating a network device with a user equipment through a network. Hence, the network device includes, but is not limited to, network host machine, a single network server, a set of multiple network servers, or a computer set based on cloud computing; or implemented by a mobile device. Here, cloud is comprised of a lot of host machines or network servers based on cloud computing, wherein cloud computing is a kind of distributed computing and is a super virtual computer comprised of a group of loosely-coupled computer sets. Here, the user equipment may be any type of electronic product capable of performing human-machine interaction with the user via a keyboard, a touch panel, a touch screen, a hand write device or the like, for example a computer, a mobile phone, a smart phone, a PDA, a wearable device, a palm computer PPC or a tablet computer. The network includes, but is not limited to, the Internet, a wide area network, a metropolitan area network, a local area network, a VPN network, and a wireless Ad hoc network. Those skilled in the art should appreciate that the above provision apparatus 1 is only an example. Other network devices or user equipment that are currently existing or might occur in the future are adapted for the present disclosure, should be included in the protection scope of the present disclosure, and are included herein by reference. Here, the network device and user equipment both include an electronic device capable of automatically performing numerical value computing and information processing according to a preset or stored instruction, and its hardware includes, but is not limited to, a microprocessor, an application-specific integrated circuit (ASIC), a field programmable gate array (FPGA), a digital signal processor (DSP), an embedded device and the like.

Specifically, the determining means 11 first, via for example an application program interface (API) provided by the user equipment on which the user is viewing a video, acquires a movement stopping operation executed by the user for the barrage information on the current video image that is being viewed by the user via a finger or a mouse, and considers the barrage information for which the movement stopping operation is executed as the barrage information to be combined, to thereby determine the first barrage information and second barrage information to be combined in the current video image. Here, the movement stopping operation includes, but is not limited to, selecting and clicking the movement stopping operation option by clicking or circling.

Figure 2:
FIG. 2 illustrates a schematic diagram of determining first barrage information and second barrage information to be combined according to an embodiment of the present disclosure.

For example, suppose that the user A is viewing video-1 on his mobile phone on which android is installed, he uses his finger to click in turn two barrage information such as "the heroine is so beautiful" and "the hero is so handsome" on the current video image, the determining means 11 may, by invoking a method of implementing onTouchEvent in Activity of the mobile phone installed with Android, namely, by means of functions event.getX( ) and event.getY( ) acquire coordinates of the clicking operation executed by the user A, so as to determine to consider "the heroine is so beautiful" and "the hero is so handsome" as the first barrage information and second barrage information to be combined respectively, as shown in FIG. 2.

Those skilled in the art should appreciate that the movement stopping operation and the manner for acquiring the movement stopping operation are only an example, other movement stopping operations and manners for acquiring the movement stopping operation that are currently existing or might occur in the future are adapted for the present disclosure, should be included in the protection scope of the present disclosure, and are included herein by reference.

Then, the combining means 12 first, via for example an application program interface (API) provided by the user equipment on which the user is viewing a video, acquires a combining operation executed by the user to combine the first barrage information and second barrage information; then, in response to the combining operation, combines the first barrage information with the second barrage information to form combined barrage information, and displays a reply window corresponding to the combined barrage information; here, the combining operation includes, but is not limited to, moving the first barrage information to be combined to a location of the second barrage information. Here, display of the reply window may be presented by clicking a reply entrance such as reply indication information.

For example, referring to the above example, the user A executes a movement operation of moving "the heroine is so beautiful" to the location of "the hero is so handsome", the combining means 12, via an application program interface (API) provided via the user A's mobile phone installed with Android, acquires the movement operation; then, the combining means 12 combines "the heroine is so beautiful" with "the hero is so handsome" to form combined barrage information "the heroine is so beautiful and the hero is so handsome", and displays it to the reply window corresponding to the combined barrage information. The procedure is as shown in FIGS. 3(*a*)-3(*b*).

Figure 3A:
FIGS. 3a-3b illustrate forming combined barrage information based on FIG. 2 and displaying a reply window corresponding to the combined barrage information.
Figure 3B:
Figure 4:
FIG. 4 illustrates a schematic diagram of replying to the combined barrage information based on FIGS. 3a-3b.

Then, the reply acquiring means 13, via for example an application program interface (API) provided by the user equipment on which the user is viewing a video, acquires reply content input by the user in the reply window to form, with the combined barrage information, combined reply barrage information. For example, further referring to the above example, suppose that the user A inputs reply content "because they are husband and wife" in the reply window as shown in FIG. 3(*b*), the reply acquiring means 13, after acquiring the reply content, forms, with the combined barrage information "the heroine is so beautiful and the hero is so handsome" obtained by the combining means 12, combined reply barrage information "the heroine is so beautiful and the hero is so handsome because they are husband and wife", as shown in FIG. 4.

Figure 5:
FIG. 5 illustrates a schematic diagram of obtained combined reply barrage information.

Then, the first providing means 14, in for example an agreed communication manner such as http and https, provides the combined reply barrage information to the user, as shown in FIG. 5.

Respective means of the provision apparatus 1 operate constantly and continuously therebetween. Specifically, the determining means 11 constantly determines the first barrage information and second barrage information to be combined in the current video image; the combining means 12 constantly, in response to a combining operation executed by the user to combine the first barrage information and the second barrage information, combines the first barrage information with the second barrage information to form combined barrage information, and displays a reply window corresponding to the combined barrage information; the reply acquiring means 13 constantly acquires reply content input by the user in the reply window to form, with the combined barrage information, combined reply barrage information; the first providing means 14 constantly provides the combined reply barrage information to the user. Here, those skilled in the art should appreciate that the word "constantly" means that between respective means of the provision apparatus 1 are respectively and continuously performed the following operations: determining the first barrage information and the second barrage information to be combined, combining them, acquiring the user reply content and providing the combined reply barrage information, until the provision apparatus 1, in a longer time period, stops determining the first barrage information and second barrage information to be combined.

Preferably, the provision apparatus 1 further comprises means (hereinafter referred to as "operation acquiring means"; not shown) for acquiring a division operation executed by the user for the combined barrage information; and means (hereinafter referred to "dividing means"; not shown) for dividing the combined barrage information according to the division operation.

Specifically, the operation acquiring means may, via for example an application program interface (API) provided by the user equipment on which the user is viewing a video, acquires the division operation executed by the user for the combined barrage information. Here, the division operation includes, but is not limited to: 1) a pre-definition operation, for example, drawing a cross on the combined barrage information to indicate division of the combined barrage information; 2) clicking the combined barrage information to select a provided option "divide" to implement the division of the combined barrage information. Those skilled in the art should appreciate that the division operation is only an example, other division operations that are currently existing or might occur in the future are adapted for the present disclosure, should be included in the protection scope of the present disclosure, and are included herein by reference.

Then, the dividing means divides the combined barrage information according to the division operation.

Here, by executing division operation for the combined barrage information to divide it, the present disclosure may effectively avoid misoperations occurring when the barrage information is combined, for example, prevent the user from wrongly combining barrage information that he does not wish to combine during combination of the barrage information.

In a preferred embodiment (referring to FIG. 1), the provision apparatus 1 may further comprise means (hereinafter referred to "pre-treating means"; not shown) for pre-treating multiple pieces of barrage information corresponding to the current video image, to provide the pre-treated barrage information to the user, wherein the determining means 11 determines the first barrage information and second barrage information from the pre-treated barrage information.

Specifically, the pre-treating means pre-treats multiple pieces of barrage information corresponding to the current video image, to provide the pre-treated barrage information to the user. Preferably, the pre-treating comprises at least any one of the following:

combining the barrage information associated with content in the multiple pieces of barrage information;

combining barrage information published for the same element among the multiple pieces of barrage information.

For example, if the pre-treating comprises combining the barrage information associated with content in the multiple pieces of barrage information, the barrage information associated with content includes, but is not limited to: 1) barrage information published for the same character; 2) barrage information with similar text content. Suppose that, as for the video image shown in FIG. 2, in addition to the barrage information shown in FIG. 2, the network user further publishes the following barrage information for the video image: "funny, wait and see" and "expecting a plot to come", the pre-treating means first performs semantic analysis for multiple pieces of barrage information corresponding to the video image, combines barrage information "you will have fun" having similar text content with "funny, wait and see", for example, only retains the same word in the two barrage information and removes redundant words, to obtain new barrage information "funny".

Again for example, the pre-treating comprises combining barrage information published for the same element among the multiple pieces of barrage information, the same element here includes, but is not limited to the same event, character, expression, action and the like. Suppose that as for the video image shown in FIG. 2, in addition to the barrage information shown in FIG. 2, the network user further publishes the following barrage information for the video image: "what other plays does the actress acting as Sister Ning Xia act in", the pre-treating means first performs semantic analysis for multiple pieces of barrage information corresponding to the video image, combines barrage information published for the same character "Sister Ning Xia", for example, only considers the barrage information with the most text content as the combined barrage information, and obtains the combined barrage information "what other plays does the actress acting as Sister Ning Xia act in".

Those skilled in the art should appreciate that the above pre-treating manner is only an example, other pre-treating manners that are currently existing or might occur in the future are adapted for the present disclosure, should be included in the protection scope of the present disclosure, and are included herein by reference.

Then, the determining means 11 determines the first barrage information and the second barrage information from the pre-treated barrage information. Here, the manner of the determining means 11 determining the first barrage information and the second barrage information from the pre-treated barrage information is similar to or identical with the aforesaid manner of the determining means 11 determining the first barrage information and the second barrage information to be combined in the current video image. For the sake of brevity, the manner is not detailed any more here, and included herein by reference.

More preferably, the provision apparatus 1 may further comprise means (hereinafter referred to "publishing means";

not shown) for acquiring new barrage information about the current video image newly published by the user; means (hereinafter referred to as "detecting means"; not shown) for detecting whether to satisfy a trigger condition that there is barrage information associated the new barrage information in the multiple pieces of barrage information; means (hereinafter referred to "second providing means"; not shown) for, if the trigger condition is satisfied, providing corresponding prompt information to the user to enable the user to determine whether to combine the new barrage information with barrage information associated therewith among the multiple pieces of barrage information.

Specifically, the publishing means, via for example an application program interface (API) provided by the user equipment on which the user is viewing a video, acquires new barrage information about the current video image newly published by the user. For example, if user A newly publishes the barrage information "who plays the handsome hero" on the video image as shown in FIG. 2, the publishing means may acquire, via the application program interface (API) provided by the user A's mobile phone with Android installed, the barrage information newly published by the user A.

The detecting means detects whether to satisfy a trigger condition that there is barrage information associated the new barrage information in the multiple pieces of barrage information. Here, the "associated" here includes, but is not limited to, having approximate sense, and belonging to comments on characters with associated roles.

If the trigger condition is satisfied, the second providing means provides corresponding prompt information to the user to enable the user to determine whether to combine the new barrage information with barrage information associated therewith among the multiple pieces of barrage information.

For example, again referring to the above example, since the barrage information "who plays the handsome hero" newly published by user A is approximate to "the hero is so handsome" in sense, the detecting means judges that a trigger condition that there is barrage information associated the new barrage information in the multiple pieces of barrage information is satisfied, then the second providing means provides corresponding information for example that "suggest combining 'who plays the handsome hero' with 'the hero is so handsome'" to the user A so that the user A determines whether to combine the new barrage information with barrage information associated therewith among the multiple pieces of barrage information.

Here, by providing a prompt information of combining barrage information to the user so that the user finds barrage information that may be combined, the present disclosure effectively reduces the number of barrage information in the video image, and boosts the user's experience upon viewing video and communicating with other users via video.

FIG. 6 illustrates a flow chart of a method for providing combined barrage information according to another aspect of the present disclosure.

The method comprises step S1, step S2, step S3 and step S4. Specifically, in step S1, the provision apparatus 1 comprises means determines first barrage information and second barrage information to be combined in a current video image; in step S2, the provision apparatus 1, in response to a combining operation executed by the user to combine the first barrage information and the second barrage information, combines the first barrage information with the second barrage information to form combined barrage information, and displays a reply window corresponding to the combined barrage information; in step S3, the provision apparatus 1 acquires reply content input by the user in the reply window to form, with the combined barrage information, combined reply barrage information; in step S4, the provision apparatus 1 provides the combined reply barrage information to the user.

Here, the provision apparatus 1 is used to combine the barrage information about the video image and provide it to the user, so that the user may replay to the combined barrage information. It includes, but is not limited to, a network device, mobile device or an apparatus formed by integrating a network device with a user equipment through a network. Hence, the network device includes, but is not limited to, network host machine, a single network server, a set of multiple network servers, or a computer set based on cloud computing; or implemented by a mobile device. Here, cloud is comprised of a lot of host machines or network servers based on cloud computing, wherein cloud computing is a kind of distributed computing and is a super virtual computer comprised of a group of loosely-coupled computer sets. Here, the user equipment may be any type of electronic product capable of performing human-machine interaction with the user via a keyboard, a touch panel, a touch screen, a hand write device or the like, for example a computer, a mobile phone, a smart phone, a PDA, a wearable device, a palm computer PPC or a tablet computer. The network includes, but is not limited to, the Internet, a wide area network, a metropolitan area network, a local area network, a VPN network, and a wireless Ad hoc network. Those skilled in the art should appreciate that the above provision apparatus 1 is only an example. Other network devices or user equipment that are currently existing or might occur in the future are adapted for the present disclosure, should be included in the protection scope of the present disclosure, and are included herein by reference. Here, the network device and user equipment both include an electronic device capable of automatically performing numerical value computing and information processing according to a preset or stored instruction, and its hardware include, but is not limited to, a microprocessor, an application-specific integrated circuit (ASIC), a field programmable gate array (FPGA), a digital signal processor (DSP), an embedded device and the like.

Specifically, in step S1, the provision apparatus 1 first, via for example an application program interface (API) provided by the user equipment on which the user is viewing a video, acquires a movement stopping operation executed by the user for the barrage information on the current video image that is being viewed by the user via a finger or a mouse, and considers the barrage information for which the movement stopping operation is executed as the barrage information to be combined, to thereby determine the first barrage information and second barrage information to be combined in the current video image. Here, the movement stopping operation includes, but is not limited to, selecting and clicking the movement stopping operation option by clicking or circling.

For example, suppose that the user A is viewing video-1 on his mobile phone on which android is installed, he uses his finger to click in turn two barrage information such as "the heroine is so beautiful" and "the hero is so handsome" on the current video image, in step S1, the provision apparatus 1 may, by invoking a method of implementing onTouchEvent in Activity of the mobile phone installed with Android, namely, by means of functions event.getX( ) and event.getY( ) acquire coordinates of the clicking operation executed by the user A, so as to determine to consider "the heroine is so beautiful" and "the hero is so handsome" as the first barrage information and second barrage information to be combined respectively, as shown in FIG. 2.

Those skilled in the art should appreciate that the movement stopping operation and the manner for acquiring the movement stopping operation are only an example, other movement stopping operations and manners for acquiring the movement stopping operations that are currently existing or might occur in the future are adapted for the present disclosure, should be included in the protection scope of the present disclosure, and are included herein by reference.

Then, in step S2, the provision apparatus 1 first, via for example an application program interface (API) provided by the user equipment on which the user is viewing a video, acquires a combining operation executed by the user to combine the first barrage information and second barrage information; then, in response to the combining operation, combines the first barrage information with the second barrage information to form combined barrage information, and displays a reply window corresponding to the combined barrage information; here, the combining operation includes, but is not limited to, moving the first barrage information to be combined to a location of the second barrage information. Here, display of the reply window may be presented by clicking a reply entrance such as reply indication information.

For example, referring to the above example, the user A executes a movement operation of moving "the heroine is so beautiful" to the location of "the hero is so handsome", in step S2, the provision apparatus 1, via an application program interface (API) provided via the user A's mobile phone installed with Android, acquires the movement operation; then, in step S2, the provision apparatus 1 combines "the heroine is so beautiful" with "the hero is so handsome" to form combined barrage information "the heroine is so beautiful and the hero is so handsome", and displays it to the reply window corresponding to the combined barrage information. The procedure is as shown in FIGS. 3(a)-3(b).

Then, in step S3, the provision apparatus 1, via for example an application program interface (API) provided by the user equipment on which the user is viewing a video, acquires reply content input by the user in the reply window to form, with the combined barrage information, combined reply barrage information. For example, further referring to the above example, suppose that the user A inputs reply content "because they are husband and wife" in the reply window as shown in FIG. 3(b), in step S3, the provision apparatus 1, after acquiring the reply content, forms, with the combined barrage information "the heroine is so beautiful and the hero is so handsome" obtained by the provision apparatus 1 in step S2, combined reply barrage information "the heroine is so beautiful and the hero is so handsome because they are husband and wife", as shown in FIG. 4.

Then, in step S4, the provision apparatus 1, in for example an agreed communication manner such as http and https, provides the combined reply barrage information to the user, as shown in FIG. 5.

Steps of the method operate constantly and continuously therebetween. Specifically, in step S1, the provision apparatus 1 constantly determines the first barrage information and second barrage information to be combined in the current video image; in step S2, the provision apparatus 1 constantly, in response to a combining operation executed by the user to combine the first barrage information and the second barrage information, combines the first barrage information with the second barrage information to form combined barrage information, and displays a reply window corresponding to the combined barrage information; in step S3, the provision apparatus 1 constantly acquires reply content input by the user in the reply window to form, with the combined barrage information, combined reply barrage information; in step S4, the provision apparatus 1 constantly provides the combined reply barrage information to the user. Here, those skilled in the art should appreciate that the word "constantly" means that between respective steps of the method are respectively and continuously performed the following operations: determining the first barrage information and the second barrage information to be combined, combining them, acquiring the user reply content and providing the combined reply barrage information, until the provision apparatus 1, in a longer time period, stops determining the first barrage information and second barrage information to be combined.

Preferably, the method further comprises step S5 (not shown) and step S6 (not shown). Specifically, in step S5, the provision apparatus 1 acquires a division operation executed by the user for the combined barrage information; and in step S6, the provision apparatus 1 divides the combined barrage information according to the division operation.

Specifically, in step S5, the provision apparatus 1 may, via for example an application program interface (API) provided by the user equipment on which the user is viewing a video, acquires the division operation executed by the user for the combined barrage information. Here, the division operation includes, but is not limited to: 1) a pre-definition operation, for example, drawing a cross on the combined barrage information to indicate division of the combined barrage information; 2) clicking the combined barrage information to select a provided option "divide" to implement the division of the combined barrage information. Those skilled in the art should appreciate that the division operation is only an example, other division operations that are currently existing or might occur in the future are adapted for the present disclosure, should be included in the protection scope of the present disclosure, and are included herein by reference.

Then, in step S6, the provision apparatus 1 divides the combined barrage information according to the division operation.

Here, by executing division operation for the combined barrage information to divide it, the present disclosure may effectively avoid mis-operations occurring when the barrage information is combined, for example, prevent the user from wrongly combining barrage information that he does not wish to combine during combination of the barrage information.

In a preferred embodiment (referring to FIG. 6), the method may further comprise step S7 (not shown). Specifically, in step S7, the provision apparatus 1 may pre-treat multiple pieces of barrage information corresponding to the current video image, to provide the pre-treated barrage information to the user, wherein in step S1, the provision apparatus 1 determines the first barrage information and second barrage information from the pre-treated barrage information.

Specifically, in step S7, the provision apparatus 1 pre-treats multiple pieces of barrage information corresponding to the current video image, to provide the pre-treated barrage information to the user. Preferably, the pre-treating includes at least any one of the following:

combining the barrage information associated with content in the multiple pieces of barrage information;

combining barrage information published for the same element among the multiple pieces of barrage information.

For example, if the pre-treating includes combining the barrage information associated with content in the multiple pieces of barrage information, the barrage information associated with content includes, but is not limited to: 1) barrage information published for the same character; 2) barrage information with similar text content. Suppose that, as for the video image shown in FIG. 2, in addition to the barrage information shown in FIG. 2, the network user further publishes the following barrage information for the video image: "funny, wait and see" and "expecting a plot to come", in step S7, the provision apparatus 1 first performs semantic analysis for multiple pieces of barrage information corresponding to the video image, combines barrage information "you will have fun" having similar text content with "funny, wait and see", for example, only retains the same word in the two barrage information and removes redundant words, to obtain new barrage information "funny".

Again for example, the pre-treating comprises combining barrage information published for the same element among the multiple pieces of barrage information, the same element here includes, but is not limited to, the same event, character, expression, action and the like. Suppose that as for the video image shown in FIG. 2, in addition to the barrage information shown in FIG. 2, the network user further publishes the following barrage information for the video image: "what other plays does the actress acting as Sister Ning Xia act in", in step S7, the provision apparatus 1 first performs semantic analysis for multiple pieces of barrage information corresponding to the video image, combines barrage information published for the same character "Sister Ning Xia", for example, only considers the barrage information with the most text content as the combined barrage information, and obtains the combined barrage information "what other plays does the actress acting as Sister Ning Xia act in".

Those skilled in the art should appreciate that the above pre-treating manner is only an example, other pre-treating manners that are currently existing or might occur in the future are adapted for the present disclosure, should be included in the protection scope of the present disclosure, and are included herein by reference.

Then, in step S1, the provision apparatus 1 determines the first barrage information and the second barrage information from the pre-treated barrage information. Here, the manner of the provision apparatus 1 determining the first barrage information and the second barrage information from the pre-treated barrage information in step is similar to or identical with the aforesaid manner of the provision apparatus 1 determining the first barrage information and the second barrage information to be combined in the current video image in step S1. For the sake of brevity, the manner is not detailed any more here, and included herein by reference.

More preferably, the method may further comprise step S8 (not shown) and step S9 (not shown) and step S10 (not shown). Specifically, in step S8, the provision apparatus 1 acquires new barrage information about the current video image newly published by the user; in step S9, the provision apparatus 1 detects whether to satisfy a trigger condition that there is barrage information associated the new barrage information in the multiple pieces of barrage information; if the trigger condition is satisfied, in step S10, the provision apparatus 1 provides corresponding prompt information to the user to enable the user to determine whether to combine the new barrage information with barrage information associated therewith among the multiple pieces of barrage information.

Specifically, in step S8, the provision apparatus 1, via for example an application program interface (API) provided by the user equipment on which the user is viewing a video, acquires new barrage information about the current video image newly published by the user. For example, if user A newly publishes the barrage information "who plays the handsome hero" on the video image as shown in FIG. 2, in step S8, the provision apparatus 1 may acquire, via the application program interface (API) provided by the user A's mobile phone with Android installed, the barrage information newly published by the user A.

In step S9, the provision apparatus 1 detects whether to satisfy a trigger condition that there is barrage information associated the new barrage information in the multiple pieces of barrage information. Here, the term "associated" here includes, but is not limited to, having approximate sense, and belonging to comments on characters with associated roles.

If the trigger condition is satisfied, in step S10, the provision apparatus 1 provides corresponding prompt information to the user to enable the user to determine whether to combine the new barrage information with barrage information associated therewith among the multiple pieces of barrage information.

For example, again referring to the above example, since the barrage information "who plays the handsome hero" newly published by user A is approximate to "the hero is so handsome" in sense, in step S9, the provision apparatus 1 judges that a trigger condition that there is barrage information associated the new barrage information in the multiple pieces of barrage information is satisfied, then in step S10, the provision apparatus 1 provides corresponding information for example that "suggest combining 'who plays the handsome hero' with 'the hero is so handsome'" to the user A so that the user A determines whether to combine the new barrage information with barrage information associated therewith among the multiple pieces of barrage information.

Here, by providing a prompt information of combining barrage information to the user so that the user finds barrage information that may be combined, the present disclosure effectively reduces the number of barrage information in the video image, and boosts the user's experience upon viewing video and communicating with other users via video.

It should be noted that the present disclosure may be implemented in software and/or a combination of software and hardware, for example, implemented by an application-specific integrated circuit (ASIC), a general purpose computer or any other similar hardware devices. In one embodiment, the software program of the present disclosure may be executed by a processor to perform the above steps or functions. Likewise, the software program of the present disclosure (including the relevant data structure) may be stored in a computer-readable recording medium, e.g., RAM memory, magnetic or optical driver or soft floppy disk or a similar device. Additionally, some steps or functions of the present disclosure may be implemented using hardware, e.g., as a circuit cooperating with the processor to perform various functions or steps.

In addition, a portion of the present disclosure may be applied as a computer program product, e.g., a computer program instruction. When it is executed by the computer, a method and/or technical solution according to the present disclosure may be invoked or provided through operations of the computer. The program instruction for invoking the method of the present disclosure may be stored in a stationary or movable recording medium, and/or transmitted via data stream in broadcast or other signal bearing media, and/or stored in a working memory of a computer device running according to the program instruction. Here, an embodiment according to the present disclosure includes a device which includes a memory for storing the computer program instruction and a processor for executing the program instruction, wherein when the computer program instruction is executed by the processor, the device is triggered to run the method and/or technical solution in a plurality of embodiments according to the present disclosure.

For those skilled in the art, it is obvious that the present disclosure is not limited to the details of the above exemplary embodiments, and the present disclosure can be implemented in other specific forms without departing from the spirit or basic features of the present disclosure. Therefore, in any way, the embodiments shall be regarded as exemplary rather than limiting; the scope of the present disclosure is limited by the appended claims, instead of the above description. Thus, all variations which fall into the meaning and scope of equivalent elements of the claims shall be covered within the present disclosure. No reference signs in the claims shall be regarded as limiting the involved claims. Besides, it is obvious that the term "comprise" does not exclude other units or steps, and singularity does not exclude plurality. A plurality of units or means set forth in a system claim may also be implemented by a single unit or means through software or hardware. Terms such as first and second are used to indicate names, but do not indicate any particular sequence.

What is claimed is:

1. A method for providing combined barrage information, the method comprising:
   determining first barrage information and second barrage information to be combined in a current video image;
   combining the first barrage information with the second barrage information to form combined barrage information in response to a combining operation executed by the user to combine the first barrage information and the second barrage information, and displaying a reply window corresponding to the combined barrage information; and
   acquiring reply content input by the user in the reply window to form, with the combined barrage information, combined reply barrage information; and providing the combined reply barrage information to the user;
   the method further comprising:
   pre-treating multiple pieces of barrage information corresponding to the current video image by (a) performing semantic analysis for the multiple pieces of barrage information corresponding to the video image and (b) combining the barrage information having associated contents in the multiple pieces of barrage information or combining the barrage information published for an identical element among the multiple pieces of barrage information, to provide the pre-treated barrage information to the user, the combining the barrage information having associated contents in the multiple pieces of barrage information comprising retaining identical words in the two barrage information having associated contents and removing redundant words;
   and the combining the barrage information published for an identical element among the multiple pieces of barrage information comprising considering the barrage information published for an identical element with the most text content as the combined barrage information;
   wherein the determining first barrage information and second barrage information to be combined in a current video image comprises:
   determining the first barrage information and the second barrage information from the pre-treated barrage information.

2. The method according to claim 1, the method further comprising:
   acquiring new barrage information about the current video image newly published by the user;
   detecting whether a trigger condition that barrage information in the multiple pieces of barrage information is associated with the new barrage information is satisfied;
   providing, in response to determining that the trigger condition is satisfied, corresponding prompt information to the user to enable the user to determine whether to combine the new barrage information with the barrage information associated therewith among the multiple pieces of barrage information.

3. The method according to claim 1, the method further comprising:
   acquiring a division operation executed by the user for the combined barrage information; and
   dividing the combined barrage information according to the division operation.

4. A provision apparatus for providing combined barrage information, the provision apparatus comprising:
   at least one processor; and
   a memory storing instructions, the instructions when executed by the at least one processor, cause the at least one processor to perform operations, the operations comprising:
   determining first barrage information and second barrage information to be combined in a current video image;
   combining the first barrage information and the second barrage information to form combined barrage information in response to a combining operation executed by the user to combine the first barrage information and the second barrage information, and displaying a reply window corresponding to the combined barrage information;
   acquiring reply content input by the user in the reply window to form, with the combined barrage information, combined reply barrage information; and
   providing the combined reply barrage information to the user;
   the operations further comprising:
   pre-treating multiple pieces of barrage information corresponding to the current video image by (a) performing semantic analysis for the multiple pieces of barrage information corresponding to the video image and (b) combining the barrage information having associated contents in the multiple pieces of barrage information or combining the barrage information published for an identical element among the multiple pieces of barrage information, to provide the pre-treated barrage information to the user, the combining the barrage information having associated contents in the multiple pieces of barrage information comprising retaining identical words in the two barrage information having associated contents and removing redundant words;
   and the combining the barrage information published for an identical element among the multiple pieces of barrage information comprising considering the barrage information published for an identical element with the most text content as the combined barrage information;

wherein the determining first barrage information and second barrage information to be combined in a current video image comprises:
determining the first barrage information and the second barrage information from the pre-treated barrage information.

5. The provision apparatus according to claim 4, the operations further comprising:
acquiring new barrage information about the current video image newly published by the user;
detecting whether a trigger condition that barrage information in the multiple pieces of barrage information is associated with the new barrage information is satisfied;
providing, in response to determining that the trigger condition is satisfied, corresponding prompt information to the user to enable the user to determine whether to combine the new barrage information with the barrage information associated therewith among the multiple pieces of barrage information.

6. The provision apparatus according to claim 4, the operations further comprising:
acquiring a division operation executed by the user for the combined barrage information; and
dividing the combined barrage information according to the division operation.

7. A barrage player, wherein the barrage player comprises the provision apparatus according to claim 4.

8. A non-transitory computer storage medium storing a computer program, which when executed by one or more processors, cause the one or more processors to perform operations, the operations comprising:
determining first barrage information and second barrage information to be combined in a current video image;
combining the first barrage information with the second barrage information to form combined barrage information in response to a combining operation executed by the user to combine the first barrage information and the second barrage information, and displaying a reply window corresponding to the combined barrage information; and
acquiring reply content input by the user in the reply window to form, with the combined barrage information, combined reply barrage information; and providing the combined reply barrage information to the user;
the operations further comprising:
pre-treating multiple pieces of barrage information corresponding to the current video image by (a) performing semantic analysis for the multiple pieces of barrage information corresponding to the video image and (b) combining the barrage information having associated contents in the multiple pieces of barrage information or combining the barrage information published for an identical element among the multiple pieces of barrage information, to provide the pre-treated barrage information to the user, the combining the barrage information having associated contents in the multiple pieces of barrage information comprising retaining identical words in the two barrage information having associated contents and removing redundant words;
and the combining the barrage information published for an identical element among the multiple pieces of barrage information comprising considering the barrage information published for an identical element with the most text content as the combined barrage information;
wherein the determining first barrage information and second barrage information to be combined in a current video image comprises:
determining the first barrage information and the second barrage information from the pre-treated barrage information.

9. The non-transitory computer storage medium according to claim 8, the operations further comprising:
pre-treating multiple pieces of barrage information corresponding to the current video image, to provide the pre-treated barrage information to the user;
wherein the determining first barrage information and second barrage information to be combined in a current video image comprises:
determining the first barrage information and the second barrage information from the pre-treated barrage information.

10. The non-transitory computer storage medium according to claim 9, wherein the pre-treating comprises at least one of the following:
combining the barrage information associated with content in the multiple pieces of barrage information; and
combining the barrage information published for an identical element among the multiple pieces of barrage information.

11. The non-transitory computer storage medium according to claim 9, the operations further comprising:
acquiring new barrage information about the current video image newly published by the user;
detecting whether a trigger condition that barrage information in the multiple pieces of barrage information is associated with the new barrage information is satisfied;
if the trigger condition is satisfied, providing corresponding prompt information to the user to enable the user to determine whether to combine the new barrage information with the barrage information associated therewith among the multiple pieces of barrage information.

12. The non-transitory computer storage medium according to claim 8, the operations further comprising:
acquiring a division operation executed by the user for the combined barrage information; and
dividing the combined barrage information according to the division operation.

* * * * *